(No Model.) 2 Sheets—Sheet 1.

E. WESTON.
ELECTRICAL MEASURING INSTRUMENT.

No. 522,948. Patented July 10, 1894.

WITNESSES:

INVENTOR
Edward Weston
BY
His ATTORNEY.

(No Model.) 2 Sheets—Sheet 2.
E. WESTON.
ELECTRICAL MEASURING INSTRUMENT.
No. 522,948. Patented July 10, 1894.
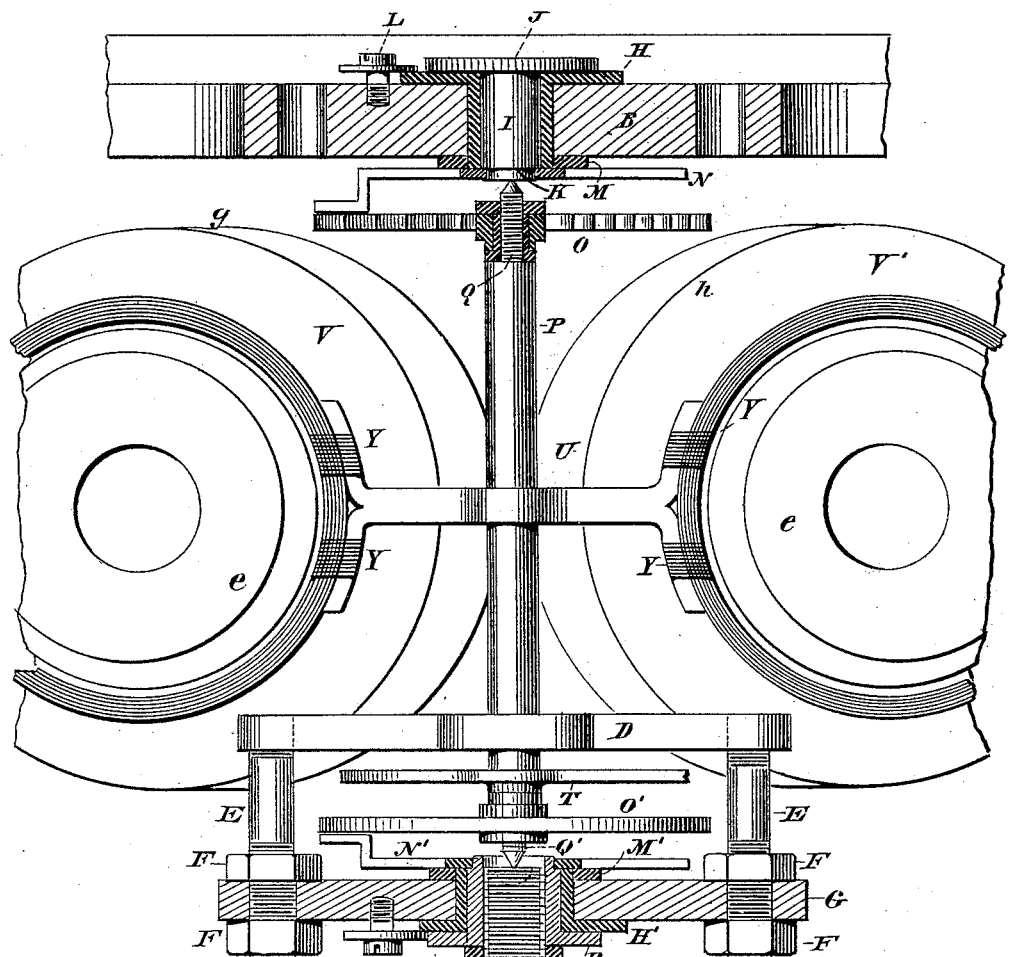
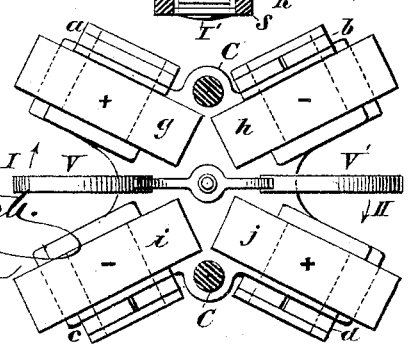

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 522,948, dated July 10, 1894.

Application filed October 3, 1892. Serial No. 447,677. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an electrical measuring instrument in which a movable coil is caused, by the mutual reaction of its field with that of a stationary or fixed coil, to vibrate and thereby to cause a movement of an indicating apparatus, the extent of which movement bears a relation to the potential difference existing between the instrument terminals; so that either current strength or pressure may thus be measured.

My invention consists more particularly in the construction and arrangement of the apparatus hereinafter set forth, wherein two coils, supported and equilibrated on the arms of a vibrating lever, are interposed between fixed coils, and in an exceedingly strong field; whereby the force applied to said coils is a couple tending to oscillate said lever on its fulcrum against the constant resistance of a suitably-disposed spring, by means of which spring the actuating force is weighed. The extent of deflection of the lever or of a pivot shaft on which said lever is supported is indicated by an index moving over a scale graduated in suitable units.

Figure 1:
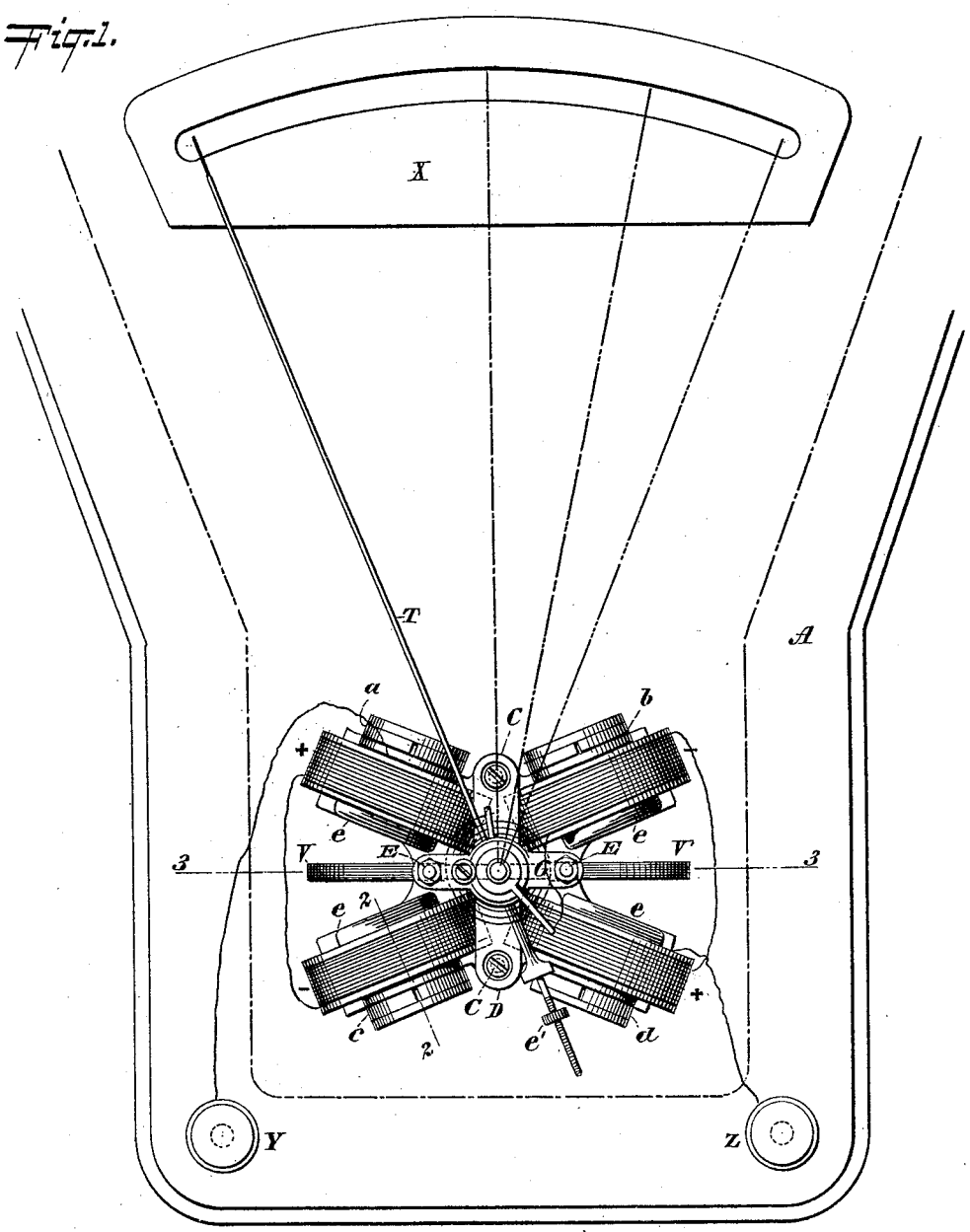
Figure 2:
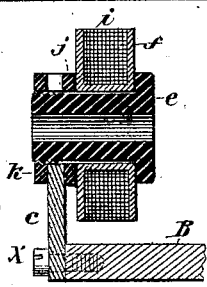

In the accompanying drawings, Figure 1 is a face view of the instrument which is preferably secured to a vertical support. Fig. 2 is a section through one of the fixed coils on the line 2, 2 of Fig. 1. Fig. 3 is a top view of the working parts of the instrument on an enlarged scale and in section on the line 3, 3 of Fig. 1. Fig. 4 is a side view of the operating parts of the instrument marked to indicate their polarity.

Similar letters of reference indicate like parts.

A is the bed-plate of the instrument. B is a flat metal plate secured thereon from which extend outward two fixed posts, C, C.

The posts C C support the cross-shaped or four-armed plate D. Extending from the opposite arms of the plate D, which arms are at right angles to those which receive the posts C, are short posts, E, Fig. 3, which are threaded at their extremities and receive thereon nuts, F. Secured upon the posts E by the nuts F is the bar G. The posts C are omitted in Fig. 3 for the sake of clearness.

In the plate B is a sleeve, H, which receives the pin I which may be of hardened steel. The pin I has a flanged head, J, and a shouldered end, K. The sleeve H is held in place by the clamping bolt and washer shown at L, the bolt entering the plate B.

Surrounding the protruding end of the sleeve H is a washer, M, and received upon the shouldered end of the pin I is an arm N which may turn freely as on a pivot upon said shouldered end. One end of the arm N is bent downward and is secured to the outer extremity of a coiled or helical spring, O. The other end of the spring O is secured to the main central pivot shaft, P. In the end of the pivot shaft P is a pointed set-screw, Q, the end of which has its bearing against the extremity of pin I. The shaft P extends through the cross-shaped plate D, and at its other extremity is provided with a set-screw, Q', which bears against the threaded pin I'. The threaded pin I' is received in a flanged sleeve, R. The sleeve R is received in another sleeve, H', which enters the bar G and has, on its protruding end, a washer, M'. The sleeve R is held in place by the threaded ring or washer S which is received upon the threaded step I'. The protruding end of the sleeve R is shouldered to receive an arm, N', similar to the arm N; and the arm N' is bent over and is fastened to the outer end of a helical spring O' similar to the spring O, the inner end of which spring O' is secured to the main pivot shaft P. Also upon the pivot shaft P is secured the index needle T.

The general arrangement of the pivot shaft P with its helical or coiled springs O and the arms N N' is substantially the same as has already been fully described by me in Letters Patent No. 392,386, dated November 6, 1888, and in various other Letters Patent for electrical measuring instruments subsequently granted to me.

The arms N and N' may be rotated upon their pivot supports, and in this way the helical springs O and O' may be more or less wound up as desired, and thus caused to offer more or less resistance to the rotary movement of the shaft P.

The pivot supports of the shaft P, namely the pins, as Q, and the threaded step I' may be adjusted as desired in order to move the shaft in the direction of its longitudinal axis.

Supported upon the middle of the shaft P are arms, U, which carry, at their extremities, coils of fine wire, V V'. I may use, instead of a coil of wire, a loop conductor of one or more turns, or any other suitable form of loop. Preferably the wire coils V and V' are made of turns of fine insulated wire closely cemented together so as to form a substantially solid coil, and these coils, V V', are supported upon the arms U by seizings or lashings of wire, Y, or by any other suitable means.

Returning now to the plate B secured thereto by screws, as X, Fig. 2, are four flat uprights or posts, $a, b, c$ and $d$. These are of metal and each one is provided near its upper portion with a circular aperture to receive a headed plug or pin, $e$, Fig. 2, of hard rubber or other insulating material. This pin has a central, longitudinal aperture made therein for the sake of lightness. Fitting upon each pin $e$ is the spool or bobbin $f$ of a fixed coil, of which coils there are therefore four, $g, h, i, j$. The coil is received upon the sleeve upon the pin $e$ and between a flange or head thereof and a loose washer, $j$, which is slipped upon the pin or plug $e$. The pin $e$ then passes through the aperture in the metal standard or post, as $c$, Fig. 2, and its protruding end is screw-threaded to receive a nut, $k$, by means of which the assembled parts are secured to the standard $c$.

Reference to Figs. 1 and 4 will clearly show the disposition of the fixed coils $g, h, i, j$ with reference to the movable coils V and V'; this arrangement being substantially such that a circle struck from the center of the pivot shaft P will pass, or approximately pass, through the centers of all of the coils. It will also be observed that the coil V is located between the fixed coils $g$ and $i$, and that the coil V' is located between the fixed coils $h$ and $j$. It therefore follows that the coil V is situated in the powerful field of force produced by the fixed coils $g$ and $i$, and that the coil V' is similarly situated in the similar field of force produced by the fixed coils $h$ and $j$.

The fixed coils $g, h, i$ and $j$ are all alike; that is to say, they are wound of similar wire and of like number of turns, and generally are to be so proportioned that each will produce a field of force similar in strength when a current circulates through all of them.

The coils V and V' are wound in opposite directions and are situated with reference to the center of shaft P at equal distances therefrom; and they are otherwise to be proportioned and arranged so that one will equilibrate the other, and so that each, when both are traversed by a current, will produce a field of force in its vicinity of like strength. Furthermore, referring to either movable coil, as V, and the fixed coils, as $g$ and $i$, adjacent thereto, these coils are to be so wound or constructed in any way known to the electrical workman that through the reaction of the fields of force produced around said coils the movable coil is to be attracted by one fixed coil and repelled by the other; and the same disposition is to be made with regard to the other movable coil, V', and the two fixed coils, $h$ and $j$, in proximity thereto. But the relation of all the coils is to be such that by the reaction of all of the fields of force which are produced a couple shall be generated tending to turn the shaft P on its axis. This is illustrated in Fig. 4, where, assuming the fixed coil $g$ to attract, as indicated by the sign plus, the fixed coil $i$ will repel, as indicated by the sign minus, these two coils then tending to move the movable coil V in the direction of the arrow I. On the other hand, the coil $h$ repels, as indicated by the sign minus, and the coil $j$ attracts, as indicated by the sign plus, and the movable coil V' is therefore moved in the direction of the arrow II. The forces therefore acting in the direction of the arrows I and II form a mechanical couple tending to rotate the shaft P on its axis.

The following results also are due to the above-described arrangement. Inasmuch as the two coils V and V' are wound in opposite directions, the instrument will be astatic, and not affected by terrestrial magnetism. The force which moves these coils due to the reaction of the fields as above explained will be proportional to the square of the current strength due to the difference of potential between the terminals of the instrument, and the angle of deflection of the needle T will be approximately proportional to the same. The needle T sweeps over a scale-plate, indicated at X, Fig. 1, which is marked in suitable units.

The circuit in the instrument may proceed as follows:—From binding-post Y, Fig. 1, to a fixed coil, as $g$, then to another fixed coil, as $i$, then to the arm N', spring O', and thence, for example, to the coil V, thence to the coil V', thence to the post P, to the spring O, arm N, fixed coil $h$, fixed coil $j$ and to binding-post Z. This arrangement of circuit is, however, not at all material; any other arrangement being equally suitable provided that the lead of the circuit is such as to produce fields having the relation to one another before described, and provided that the current be led into and out of the movable coils through the spiral springs O and O'. The rear end of the index needle T is screw-threaded and is provided with a nut, $e'$, by adjusting which nut the weight of the long end of the needle may be counterbalanced, and thus any dipping tendency of the needle may be prevented.

By the term "normal or rest position" of the movable coils as herein used, I mean the position which the said movable coils take when no current is traversing the instrument.

By the term "coil" as herein used, I mean any conductor in loop form regardless of the number of turns of loops employed.

I claim—

1. In an electrical measuring instrument, a vibrating lever, a coil supported on one arm thereof, a fixed coil in inductive proximity to said movable coil, a means of equilibrating said movable coil and a spring opposing the vibration of said lever.

2. In an electrical measuring instrument, a vibrating lever, a coil supported on one arm thereof, a fixed coil in inductive proximity to said movable coil, a means of equilibrating said movable coil, a spring opposing the vibration of said lever and a means of indicating the extent of vibration of said lever.

3. In an electrical measuring instrument, a vibrating lever, two coils supported on opposite arms of said lever and balancing one another, two fixed coils in inductive proximity to said movable coils and a spring opposing the vibration of said lever; the said coils being relatively so disposed that the reaction of their fields when traversed by a current produces a couple tending to vibrate said lever.

4. In an electrical measuring instrument, a vibrating lever, two coils supported by said lever and respectively located on opposite sides of the fulcrum thereof, two coils in inductive proximity to said movable coils and a spring opposing the movement of said lever; the said coils being relatively so disposed that the reaction of their fields when traversed by a current produces a couple tending to vibrate said lever.

5. In an electrical measuring instrument, a vibrating lever, two coils supported by said lever and respectively located on opposite sides of the fulcrum thereof, two fixed coils in inductive proximity to said movable coils, a spring opposing the movement of said lever and an indicating apparatus showing the extent of deflection of said lever; the said coils being relatively so disposed that the reaction of their fields when traversed by a current produces a couple tending to vibrate said lever.

6. In an electrical measuring instrument, a vibrating lever, a coil supported on one arm thereof, two fixed coils in inductive proximity to and on opposite sides of said movable coil, means of equilibrating said movable coil and a spring opposing the vibration of said lever; the said coils being so constructed and arranged that the movable coil is attracted by one fixed coil and repelled by the other.

7. In an electrical measuring instrument, a vibrating lever, two counterbalancing coils supported thereby and respectively located on opposite sides of the fulcrum thereof, two fixed coils disposed on opposite sides of each of said movable coils and a spring opposing the movement of said lever; the said coils being so constructed and arranged that the movable coil disposed between each pair of fixed coils shall be attracted by one fixed coil and repelled by the other, and so that the resulting effect of the reaction of the fields of said coils shall be a couple tending to vibrate said lever.

8. In an electrical measuring instrument, a vibrating lever, two counterbalancing coils supported thereby and respectively located on opposite sides of the fulcrum thereof, two fixed coils in inductive proximity to said movable coils and a spring opposing the movement of said lever; the said fixed coils being located in planes radial to the lever fulcrum as a center and disposed with reference to said movable coils so that the reaction of the fields due to a current traversing said coils shall produce a couple tending to vibrate said lever.

9. In an electrical measuring instrument, a pivot shaft, two counterbalancing coils supported on opposite sides of said shaft, two fixed coils, each in inductive proximity to one of said movable coils, and a spring opposing the vibration of said pivot shaft; the said coils being relatively so disposed that the reaction of their fields when traversed by a current produces a couple tending to rotate said pivot shaft.

10. In an electrical measuring instrument, a pivot shaft, two counterbalancing coils supported on opposite sides of said shaft, two fixed coils, each in inductive proximity to one of said movable coils and respectively located on opposite sides of a plane passing through said movable coils and a spring opposing the vibration of said pivot shaft.

11. In an electrical measuring instrument, a pivot shaft, two counterbalancing coils supported on opposite sides of said shaft, two fixed coils, each in inductive proximity to one of said movable coils and respectively located on opposite sides of a plane passing through said movable coils and a coiled spring interposed between said pivot shaft and an abutment and opposing the motion of said shaft.

12. In an electrical measuring instrument, a pivot shaft, two counterbalancing coils supported on opposite sides of said shaft, two fixed coils, each in inductive proximity to one of said movable coils and respectively located on opposite sides of a plane passing through said movable coils, two coiled springs secured to said pivot shaft on opposite sides of said coiled supports and interposed between said shaft and an abutment, and circuit connections whereby the current may be led through one of said springs to said movable coils and thence through the other of said springs.

13. In an electrical measuring instrument, a vibrating lever, a coil supported on one arm thereof, a fixed coil in inductive proximity to said movable coil, a means of equilibrating said movable coil, a means of adjusting said movable coil in the plane of its own face with reference to said fixed coil and a spring opposing the vibration of said lever.

14. In an electrical measuring instrument, a pivot shaft, two counterbalancing coils supported on opposite sides of said shaft, two fixed coils, each in inductive proximity to one of said movable coils, a spring opposing the vibration of said pivot shaft and means for longitudinally adjusting said pivot shaft; the said coils being relatively so disposed that the reaction of their fields when traversed by a current produces a couple tending to rotate said pivot shaft.

15. In an electrical measuring instrument, the combination of the pivot shaft P, the coils V V' supported thereon, a coiled spring, as O, opposing the rotary movement of said shaft P and fixed coils $h$ and $i$; the said fixed coils $h$ and $i$ being disposed in inductive proximity to said coils V V' on opposite sides of said shaft P and having their faces placed relatively parallel to one another and at an angle to the normal or rest position of said movable coils.

16. In an electrical measuring instrument, the combination of the pivot shaft P having a protruding arm, a coil, V, supported on said arm, a coiled spring, as O, opposing the movement of said shaft P and fixed coils $g$ and $i$; the said fixed coils being disposed in inductive proximity to and on opposite sides of said coil V and having their faces placed relatively at an angle to one another and to the normal or rest position of said coil V.

17. In an electrical measuring instrument, the combination of the pivot shaft P, the coils V V' supported thereon, a coiled spring, as O, opposing the rotary movement of said shaft P and fixed coils $h$, $i$, $g$, $j$; one pair of said coils, $h$ and $j$, being located on one side of the shaft P and the other pair of said coils, $g$ and $i$, on the other side; the said pair $h$ $j$ receiving between them the coil V' and the said pair $g$ $i$ receiving between them the coil V; the aforesaid coils being disposed so that a plane passing through the faces of the two coils V V', a second plane passing through the faces of the two coils $g$ $j$ and a third plane passing through the faces of the two coils $h$ $i$ will intersect at the axial line of said shaft.

EDWARD WESTON.

Witnesses:
A. H. HOEFER,
R. O. HEINRICH.